United States Patent [19]

Smucker et al.

[11] Patent Number: 4,738,089
[45] Date of Patent: Apr. 19, 1988

[54] CRANKSHAFT STIFFENER ASSEMBLY

[75] Inventors: Phillip J. Smucker; James S. Hayek, both of Racine, Wis.

[73] Assignee: Textron Inc., Providence, R.I.

[21] Appl. No.: 6,744

[22] Filed: Jan. 27, 1987

[51] Int. Cl.⁴ .............................................. A01D 34/67
[52] U.S. Cl. ............................................ 56/255; 56/295
[58] Field of Search ........................... 56/295, 255, 11.3

[56] References Cited

U.S. PATENT DOCUMENTS

| | | | |
|---|---|---|---|
| 2,720,071 | 10/1955 | Watanabe | 56/295 |
| 2,976,665 | 3/1961 | Speckman | 56/255 |
| 3,000,165 | 9/1961 | Lill | 56/295 |
| 3,044,241 | 7/1962 | Snider | 56/295 |
| 3,050,925 | 8/1962 | West et al. | 56/295 |
| 3,157,978 | 11/1964 | McMullen | 56/295 |
| 3,788,050 | 1/1974 | Houst et al. | 56/295 |
| 3,886,716 | 6/1975 | Sellers | 56/255 |
| 3,890,773 | 6/1975 | Frost | 56/255 |
| 4,205,737 | 6/1980 | Harkness et al. | 56/11.3 |
| 4,369,616 | 1/1983 | Cody et al. | 56/11.3 |

Primary Examiner—Paul J. Hirsch
Attorney, Agent, or Firm—Abraham Ogman

[57] ABSTRACT

The invention deals with a stiffener assembly for an engine crankshaft to protect the crankshaft against radial bending.

8 Claims, 1 Drawing Sheet

CRANKSHAFT STIFFENER ASSEMBLY

BACKGROUND OF THE INVENTION

This invention is directed to a structural assembly designed to absorb impact so as to minimize the threat of radially bending the crankshaft of a gas engine—in this instance, an engine in a rotary lawn mower.

Briefly, the protection is provided by building into the structure (i) a stiffener assembly which functions to absorb impact energy while minimizing radial deflection of the crankshaft and (ii) a friction slip clutch type of mounting to permit the cutting blade to rotate relative to its fastener.

Though the engine crankshaft is generally used to rotate the cutting blade directly, the invention will apply to any exposed shaft.

BRIEF SUMMARY OF THE INVENTION

During the normal course of events during conventional mowing operations, it is virtually impossible to avoid an occasional impact with a solid object like a curb, a tree root, a stake, or a sprinkler head.

The impact imparts a radial bending force to the crankshaft. In most mowers, this impact, if severe enough, will cause the crankshaft to bend. For example, a one-inch stake in the ground will bend a ⅝-inch diameter crankshaft. When the crankshaft bends at the very least, a serious vibration is introduced into the equipment which requires replacement of one or more engine parts. Frequently, the stress from an impact is transferred to the engine housing where the stress will bend or crack one or more parts of the engine housing. A new engine housing is the repair procedure.

Historically, the art has gravitated from long crankshafts to short crankshafts with the cutting blade secured to the crankshaft by means of a long bolt. A stiffener is provided between the blade and the crankshaft to prevent, if possible, catastrophic bending of the crankshaft.

In some prior designs, the cutting blade is prevented from rotating relative to its support because holes are provided in the blade to mate with complementary projection in the blade support.

In another case, the crankshaft is supported by the engine housing by diagonal struts connected to the engine housing and extending toward the crankshaft. In this case, the term "diagonal" or "diagonally" is used to describe a linear member which, if rotated about the axis of rotation of the crankshaft, would define a conical surface. As will be seen later, the region of the crankshaft assembly where the strut connects is critical.

It is an object of the invention to provide a new and improved crankshaft stiffener assembly which avoids the limitations and disadvantages of such prior devices.

It is yet another object of the invention to provide a crankshaft assembly which relies on a unique conical member in combination with a unique bushing to prevent damage to the crankcase shaft of mowers.

It is yet another object of the invention to provide "friction" energy absorbing means.

It is still another object of the invention to provide a diagonal stiffener subassembly which virtually eliminates the threat of bending the crankshaft.

It is still another object of the invention to provide a diagonal stiffener subassembly based on the use of a diagonal stiffener in the form of a cone in combination with a bushing bearing to virtually eliminate radial crankshaft bending and engine housing damage.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

DETAILED DESCRIPTION

Figure 1:
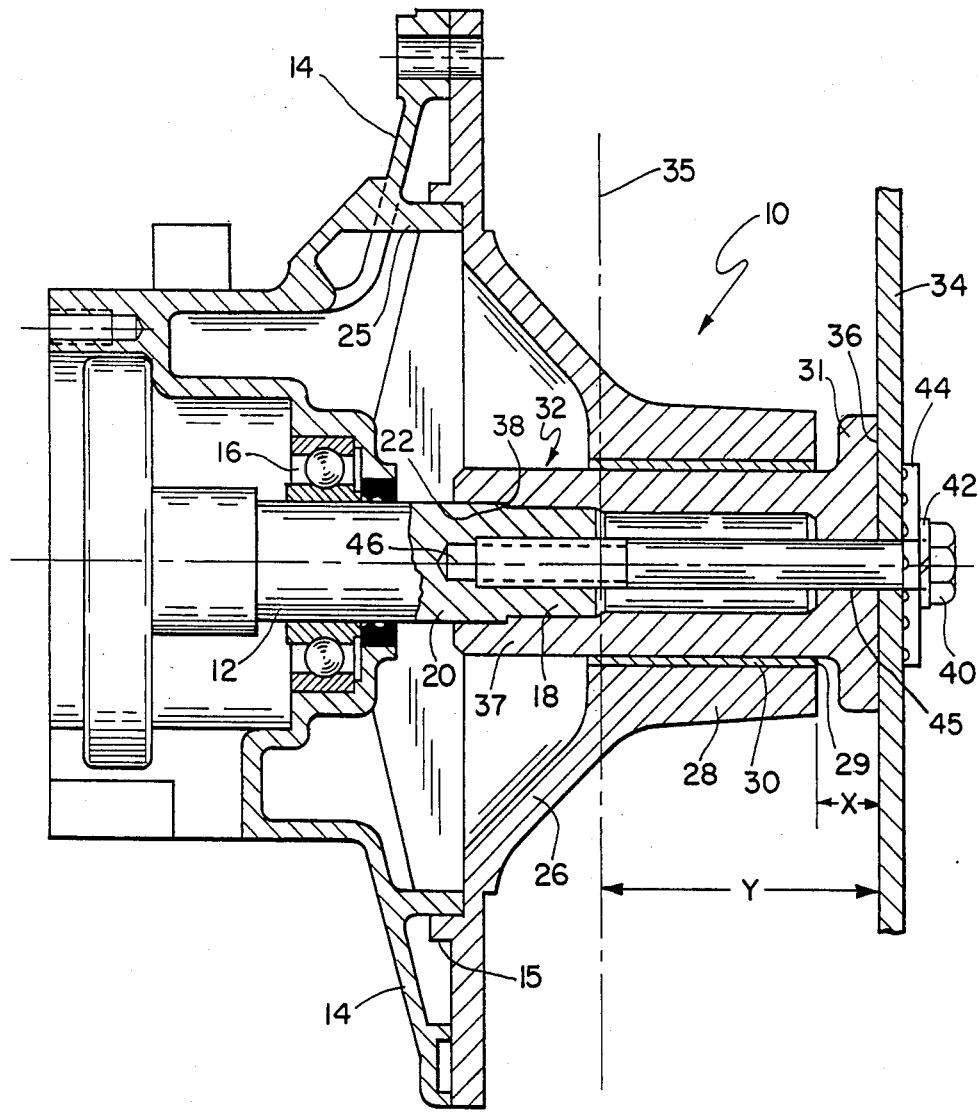
FIG. 1 is a sectional representation of the crankshaft stiffener assembly embodying the principles of the present invention.

Referring to FIG. 1, there is shown a crankcase shaft stiffener assembly 10 mounted to an engine housing cover 14 of a lawn mower engine (not shown).

An engine crankshaft 12 is shown extending through a ball bearing 16 mounted in the engine housing 14. The terminal end of the crankshaft 18 has a smaller diameter than an adjacent large diameter portion 20 forming a shoulder 22. The engine housing contains a cylindrical pilot ring 25.

A cutting blade 34 is connected to the crankshaft 12 by means of an adapter 32.

One end 31 of the adapter 32, hereinafter referred to as the remote end 31 of the adapter 32, has an enlarged flat surface 36 to support cutting blade 34 against the flat surface 36.

The other end or proximate end 37 of the adapter is configured to fit over the terminal end 18 and the large diameter portion 20 of the crankshaft. A shoulder 38 in the adapter 32 rests against the shoulder 22. The phantom line 35 divides the distance between the bearing 16 and the cutting blade in half and represents the line of demarcation between the proximate end 37 and the remote end 31 of the adapter 32.

The cutting blade 34 is secured to the crankshaft by means of a bolt 40 passing through a lockwasher 42 and a serrated washer 44. The bolt 40 is piloted through a passage 45 in the adapter 32. The term "piloted" as used herein is intended to mean diametrical clearances of greater than zero to less than 0.015 inches. The bolt 40 is threaded into a conforming threaded hole 46 in the terminal end 18 of the crankshaft. Typically, the exposed distance from the ball bearing 16 to the cutting blade 34 is 3 to 4 inches. It is made as short as possible to minimize bending moment at the crankshaft bearing support.

The cutting blade 34 is held in compression against the flat surface 36 of the adapter 32. The adapter 32 is held in compression against the crankshaft 12 at the shoulders 22 and 38.

Under normal cutting, in the absence of an obstruction, there is enough compression to prevent any relative moment of the cutting blade 34 relative to the adapter 32. The adapter 32 in turn does not move relative to the crankshaft 12 in the normal cutting mode due to the compression forces.

The adapter 32 is supported by a bushing bearing 30 which is pressed into a bushing housing 28. A stiffener 26 in the form of a truncated cone is connected at its small diameter end to the bushing housing 28. The conical stiffener 26 extends diagonally outwardly and terminates at its base in a cylindrical ring 15 which mates with the pilot ring 25 on the engine housing 14. The rings 15 and 25 are normally in contact with one another with little or no clearance.

Heretofore, diagonal stiffening utilizing individual struts has been used. In all such cases, however, the struts support the engine crankshaft in the proximate end of the stiffener adjacent to the engine housing 14 and the bearing 16.

An important consideration is the placement of the bushing relative to the blade, i.e., the distance "X" in FIG. 1. The bushing acts to support the blade adapter and therefore the crankshaft during impact. Placing the bushing edge 29 as close to the blade as possible reduces the lever arm between the point of impact (the blade) and the point of support (the bushing). A smaller lever arm means a smaller bending moment which, in turn, means less stress in the crankshaft.

The placement of the remote edge 29 of the bushing relative to the cutting blade or the distance "X" is the most significant factor contributing to the reliable support, as this distance controls the magnitude of the radial bending moment. Ideally, minimum "X" should approach 0.00. As this is not feasible, a distance "X" equal to about ¼ to ⅜ of an inch is preferred. As a practical matter, the distance "X" should not exceed one-half of the distance between the blade 34 and the bearing 16 or the distance "Y."

Also in the worst case condition, the maximum diametrical clearance, considering the bolt/adapter, the adapter/bushing, and the pilot ring 15/ring 25 is 0.045. This small value is exceptional. The radial movement of the crankshaft is thus very limited before the full effect of the several stiffening means is brought to bear to absorb the stress. Also the crankshaft runs truer because of piloting. This improves performance.

Another important factor in this inventive crankcase stiffener assembly is to provide the diagonal stiffening support at the remote end of adapter 31 spaced from the ball bearing 16 and the engine housing 14 and adjacent to the cutting blade 34. The diagonal support should join the bushing housing 28 near the phantom line 35 or closer to the cutting blade 34. The bushing housing 28 and bushing 30 have a length virtually equal to one half the length of the adapter 28 for added support and stiffness.

There are additional features which enhance the ability of the stiffener 26 to resist radial bending. On impact, the cutting blade 34 will move relative to the adapter 32 and thereby absorb some energy of the impact. Alternatively or together with the cutting blade 34, the adapter may move relative to the crankshaft at shoulders 22 and 38.

Additionally, the clearance tolerance between the adapter 32 and the bushing 30 is as close as free rotation will permit. In this way, contact is made between the adapter 32 and the bushing 30 before the crankshaft has an opportunity to bend materially. Heretofore, diametrical clearances of 0.020 plus inches are common.

In the FIG. 1 configuration, piloted diametrical clearance between the bushing 30 and the adapter 32 of 0.008 to 0.011 is possible and preferred. The smaller clearances are made possible because of the conical stiffener 26 and because the stiffener ring 15 is piloted to the engine housing pilot ring 25. There is negligible clearance and thus no radial bending due to these rings 15 and 25. In this way, precise control of the run out between the adapter 32 and bushing 30 is achieved. The precise control makes it possible to construct the elongated bushing 30 without fear of binding.

The conical stiffener 26 provides uniform support from any direction of impact unlike struts which provide maximum support only in the radial direction corresponding to the location of a strut.

Thus on impact of the blade with a stake, for example, a portion of the impact may be taken up by the friction "slip" of the blade 34 on the flat surface 36 and/or shoulder 38 on shoulder 22. A radial bending moment of the blade causes the adapter 32 to contact the bushing 30 carrying the stress to the stiffener 26 and ultimately to the engine housing 14. The FIG. 1 configuration produces an efficient and reliable crankshaft stiffener capable of managing without damage impacts which would cause catastrophic failure in prior stiffener configurations.

The FIG. 1 stiffener assembly has been tested against competitive structures, including mowers using struts. Under identical condition of speed, blade diameter and threat, the competitive units failed. The FIG. 1 design did not. The FIG. 1 design proved so reliable that it will be sold with an unprecedented extended warranty against radial impact damage.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A crankshaft stiffener assembly for a rotary mower wherein the engine crankshaft extends through an engine housing having a pilot ring defined therein, the improvement comprising:
    an adapter interconnecting the crankshaft at its proximate end and a cutting blade at its remote end, said cutting blade and said adapter being held under compression and capable of rotating relative to one another and the crankshaft;
    a bushing supporting the adapter, the edge of the bushing adjacent to but not contacting said blade and
    conical stiffening means connected to said bushing at its small end and extending outward to a ring at its base which mates with said pilot ring.

2. A crankshaft stiffener assembly for a rotary mower as defined in claim 1 where the edge of the bushing is spaced from ¼ to ⅜ inches from the blade.

3. A crankshaft stiffener assembly for a rotary mower as defined in claim 2 wherein the ring and pilot rings are cylindrical.

4. A crankshaft stiffener assembly for a rotary mower as defined in claim 1 where the blade is coupled to the crankshaft by means of a bolt piloted through the adapter to place the adapter under compression.

5. A crankshaft stiffener assembly for a rotary mower wherein the crankshaft defines an axis of rotation and extends through an engine housing to connect through an intermediate adapter with a cutting blade for rotating said cutting blade, said housing having a depending first axially aligned cylindrical surface, the improvement comprising;

a bearing through which the adapter is piloted having a remote end terminating in an edge which is adjacent to but not contacting the blade; and diagonal stiffening means having a remote and connected to said bearing and further having a base with an axially aligned second cylindrical surface projecting upwardly from said base dimensioned to conform and mesh with said first axially aligned cylindrical surface thus, limiting movement perpendicular to said axis.

6. A crankshaft stiffener assembly as defined in claim 5 where the diagonal stiffening means is conical and said mashing first and second cylindrical surfaces are surfaces of axially aligned rings.

7. A crankshaft stiffener assembly as defined in claim 5 wherein the diamtrical clearance between the adapter and the bushing is 0.008 to 0.011.

8. A crankshaft stiffener assembly for a rotary mower as defined in claim 5 wherein the edge of the bushing is spaced from ¼ to ⅜ inch from the blade.

* * * * *